Sept. 14, 1965    B. V. CURRY, JR., ET AL    3,206,019
CAN FASTENER

Filed Aug. 30, 1962    2 Sheets-Sheet 1

*INVENTORS*
BYRON V. CURRY, JR
TEOFIL L. BONKOWSKI
BY

ATTORNEY

Sept. 14, 1965  B. V. CURRY, JR., ET AL  3,206,019
CAN FASTENER
Filed Aug. 30, 1962  2 Sheets-Sheet 2
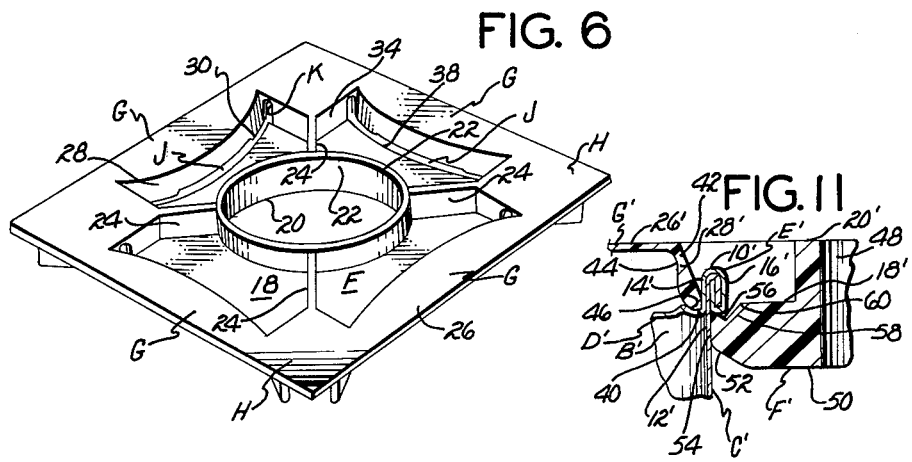
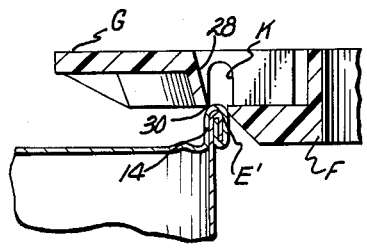
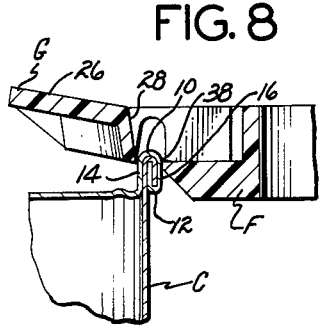
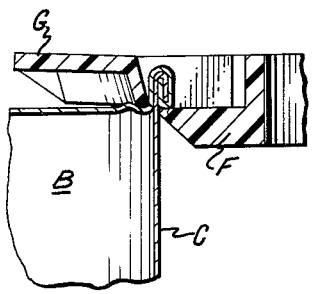
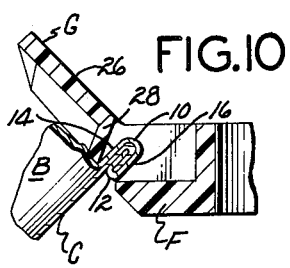
INVENTORS
BYRON V. CURRY JR
TEOFIL L. BONKOWSKI
BY
ATTORNEY

United States Patent Office 3,206,019
Patented Sept. 14, 1965

3,206,019
CAN FASTENER
Byron V. Curry, Jr., Arcadia, and Teofil L. Bonkowski, Los Angeles, Calif., assignors of one-third to Arthur B. Willis
Filed Aug. 30, 1962, Ser. No. 220,388
3 Claims. (Cl. 206—65)

The present application is a continuation-in-part of application Serial No. 82,958, filed January 16, 1961, and entitled Multiple Packaging Method and Apparatus Therefor now Patent No. 3,134,485, dated May 26, 1964.

The present invention relates generally to the field of packaging, and more specifically to a force applicable fastener that is capable of holding a number of beaded cans in a predetermined relationship.

As pointed out in our co-pending application above identified, in recent years cylindrical cans and containers having circumferentially extending beaded ends have come into a widespread use in the merchandising of liquid products such as beer, fruit juice, carbonated soft drink beverages, and the like. Also, the use of such containers in the merchandising of both solid and liquid products has increased enormously. However, while such containers are highly desirable from a merchandising standpoint in that they occupy but little more space than the contents thereof and are individually easy to handle and open, one disadvantage thereof is that it is difficult to carry a number of such containers from place to place in a compact manner.

In an effort to overcome this disadvantage, breweries and manufacturers of soft drink beverages have evolved numerous multi-pack holders or carriers which removably confine such containers in a predetermined arrangement. These multiple pack carriers normally embody folded cardboard sheets which embrace a predetermined quantity of cans, and are provided with carrying handles.

However, such carrying means have a number of major disadvantages. The cardboard carriers are relatively expensive and make a package that is considerably more bulky than if the containers were packed closely together. Also, the cardboard is heavy and increases the weight of the can or container assembly unduly. In addition, due to the heat insulating characteristics of cardboard, it is well known that it takes a considerably longer time to lower the temperature of the contents of containers packed in a cardboard carrier than it does when the containers are directly exposed to refrigeration.

A major object of the present invention is to provide an improved fastener for cylindrical containers or cans having beaded ends, whereby they are supported in a desired predetermined relationship, with each can being easily separable from the balance thereof by simply pivoting the desired can upwardly and then outwardly relative to the fastener.

Another object of the invention is to supply a fastener for use with a number of beaded containers of the same size that is simple and easy to apply, concurrently grips the beads of the various cans when moved downwardly thereon when the cans are in a predetermined relationship, and after engagement grips the cans securely enough that there is little or no lateral movement therebetween, which cans are engaged by the fastener with a sufficiently firm grip that they will not separate therefrom when subjected to shocks ordinarily encountered in transit, or in the retail handling thereof.

A still further object of the invention is to furnish an improved fastener for beaded cylindrical containers that is of extremely simple mechanical structure, and is ideally adapted to be formed by injection molding from a resin that is somewhat resilient after it has been polymerized.

Yet another object of the invention is to provide a fastener for a number of beaded cylindrical cans that is substantially impervious to any water or moisture which may be encountered should the containers be stored for a prolonged period of time in a refrigerated atmosphere, which fastener is also adapted to be formed in any desired color with the certainty that this color will remain substantially constant regardless of long exposure to light, for the colorant is included as an integral part of the polymerized resin.

A further object of the invention is to supply a fastener capable of being placed in engagement with the beads on a number of cans when disposed in a predetermined spaced relationship, either by hand or by machine.

A still further object of the invention is to provide a fastener that grips the beads of the containers disposed in a predetermined relationship with sufficient force that the containers have little or no tendency to rotate relative to one another, and as a result the cans may be labeled, with this labelling being fully visible to the purchaser if the label is so oriented at the time the cans are engaged by the fastener.

Yet a still further object of the invention is to provide a fastener that not only provides the advantages and functions outlined herein, but is of such configuration that the fastener may be readily used to transport the containers engaged thereby, by inserting a finger through an opening formed in the fastener.

These and other objects and advantages of the invention will become apparent from the following description of a preferred form thereof and from the accompanying drawings illustrating that form in which:

FIGURE 6 is an enlarged perspective view of the fastener shown in FIGURE 1;

FIGURE 7 is a fragmentary vertical cross-sectional view of the fastener showing a part thereof in contact with the upper edge portion of a beaded end just before the fastener is moved downwardly relative to the bead to engage the same;

FIGURE 8 is a fragmentary vertical cross-sectional view of the fastener being moved downwardly relative to the bead;

FIGURE 9 is an enlarged fragmentary vertical cross-sectional view showing the outer portion of the fastener engaging the lower exterior edge of the bead;

FIGURE 10 is a fragmentary vertical cross-sectional view of a portion of the fastener after the container has been rotated upwardly and outwardly to a position where it can be easily separated from the fastener by outward movement relative to the fastener; and FIGURE 11 is a fragmentary vertical cross-sectional view of an alternate form of the invention.

Figure 1:
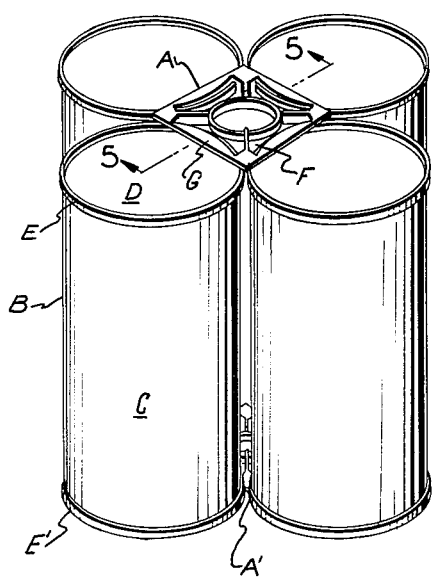
FIGURE 1 is a perspective view of four cylindrical beaded containers that are removably held together by the improved fastener of the present invention.
Figure 2:
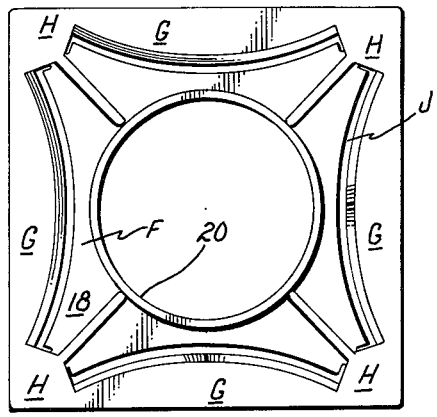
FIGURE 2 is a top plan view of the fastener.
Figure 4:
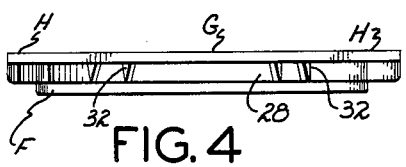
FIGURE 4 is a side elevational view of the fastener.
Figure 5:
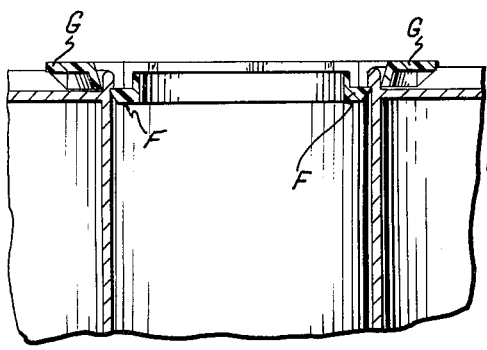
FIGURE 5 is a vertical cross-sectional view of the fastener taken on line 5—5 of FIGURE 1.

Referring now to FIGURE 1 of the drawings for the general arrangement of the invention, it will be seen that the fastener A comprises a formed or molded body, preferably formed from a polymerized resin that is stiff, somewhat resilient, and which is deformable for reasons to be hereinafter explained. A polymerized resin that has been found to be well suited for injection molding of the fastener A is, for example, an acrylonitrile-butadiene styrene copolymer known as Cycolac, commercially produced by the Marbon Chemical Division of Borg-Warner Corporation, 200 South Michigan Avenue, Chicago 4, Illinois.

As illustrated in FIGURE 1, the fastener A is adapted to be brought into forceful engagement with a number of cylindrical containers B of the same size when arranged in a predetermined relationship. Each container B includes a cylindrical side wall C and circular top and bottom end pieces D. The side wall C and end pieces D are joined by a circumferentially extending bead E. Each bead E (FIGURES 7–9) includes a first convex upper edge 10, a second convex lower edge 12, a first vertically disposed, ring-shaped surface 14, and a second vertically positioned, ring-shaped surface 16. Surface 16, as well as the second edge 12, are disposed outwardly from the exterior surface of the cylindrical side wall C, as best seen in FIGURE 8.

The detailed structure of the fastener A is best illustrated in FIGURES 2–6 inclusive, and is preferably an injection molded, integrally formed substantially square body having an inner portion F with a number of outer portions G disposed therearound. The outer portions G are preferably separated from one another by a number of extensions H which are connected to the inner portion F. The outer portions G are separated from the inner portion F by a number of arcuate slots J that are narrower in width than the thickness of beads E, for reasons to be explained hereinafter. The ends of each of the slots J develop into upwardly projecting extensions K, as may best be seen in FIGURES 7 and 8. The inner portion F preferably includes a flat web 18 in which a centrally disposed opening 20 is formed that is of sufficient cross section as to permit a finger of normal size to be projected therethrough to grip the fastener A and thus carry the containers B supported from the fastener in the manner shown in FIGURE 1.

The web 18 is reinforced against deformation by a first circular rib 22 that extends upwardly from the web and surrounds the opening 20. Further reinforcement of the web 18 is achieved by a number of second ribs 24 that also project upwardly from the web to be connected to the first rib 22 and extend therefrom in circumferentially spaced relationship, with the outer ends of the second ribs merging into the extensions H as shown in FIGURE 6.

The outer portions G and extensions H (FIGURES 2 and 6) are partially defined by a flat continuous flange 26. The flange 26 is positioned above and parallel to the upper surface of web 18. Each of the outer portions G includes a downwardly and inwardly tapering wall 28 that has a lower convex edge 30 of substantially the same radius of curvature as the inner ring-shaped surface 14.

Figure 3:
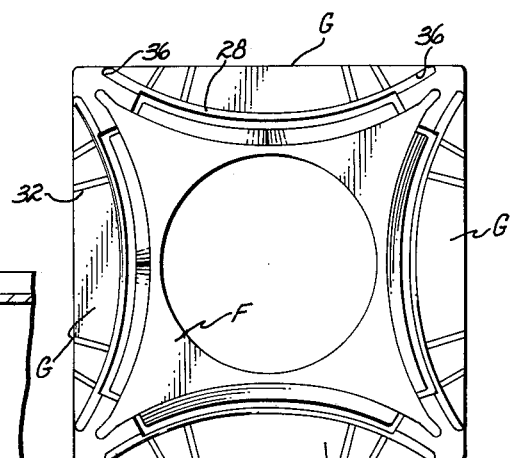
FIGURE 3 is a bottom plan view of the fastener.

A plurality of third ribs 32 that are spaced from one another in the manner shown in FIGURE 3 are included as a part of each of the outer portions G, with these ribs extending between the outer face of the wall 28 and the under face of that portion of the flange 26 most adjacent that particular wall. Each of the second ribs 24 and walls 34 which extend upwardly from the web 18 cooperate with portions of the flange 26 to define the extensions H. As best seen in FIGURE 1, the extensions H further include tabs 36 that project downwardly therefrom and are thickened extensions of the walls 28.

Web 18 has a number of circumferentially spaced concave edges 38 which partially define the slots J, with each of these edges serving as a second engaging means that initially slidably engages the second ring-shaped surface 16 (FIGURE 8) and after the fastener A has fully engaged the beads E, the edges 38 are in abutting contact with a portion of the exterior surfaces C of containers B as shown in FIGURE 9. The radius of curvature of edges 38 is substantially the same as that of the second ring-shaped surface 16.

The slot extensions K (FIGURE 7) have portions of the beads E inserted therein when the device A is in the can holding position shown in FIGURE 1.

The tabs 36 each have inner arcuate surfaces 36a, as best seen in FIGURE 3, that are disposed inwardly from the inner extremities of ribs 28. The radial spacing between the surfaces 36a and the edges 38 of the web 18 is less than the thickness of one of the beads E.

When it is desired to remove one of the containers B from the fastener A, the selected container is pivoted upwardly and outwardly as shown in FIGURE 10 to bring the second edge 12 above the upper surface of web 18, and then by application of an outwardly directed force, withdraw the container from the fastener, due to the fact that the first and second ring-shaped surfaces 14 and 16 respectively are slidable relative to the edges 30 and 38 previously described.

The use and operation of the invention are extremely simple. The fastener A is designed for use with a number of containers B of the same size when they are in a particular spaced relationship, which is preferably that shown in FIGURE 1. In the spaced arrangement shown in FIGURE 1, the inner quadrant points of the containers B are either adjacent or in contact with one another, depending on the size of the fastener A. The slots J are so positioned in the fastener A that they are in substantial vertical alignment with the first upper edges of beads E. As downward force is applied to the fastener A, the sequence of events shown in FIGURES 7–9 inclusive takes place. The downward force applied to the fastener A causes the surfaces 36a of tabs 36 to slide downwardly on circumferentially spaced portions of the first bead surfaces 14. Concurrently, the fastener A is deformed to permit the edges 38 to slide downwardly over second surfaces 16 until the edges 38 have moved below second edges 12. Thereafter, the resiliency of the material defining fastener A forces the edges 38 outwardly to positions below the second edges as shown in FIGURE 9. The beads E are then removably gripped between pairs of the tabs 36 and the edges 38, with the second edges 12 of the beads E resting on the surfaces of the web 18 adjacent the edges 38. After positioning of fastener A on the containers B is effected, the containers are ready to be carried to a desired destination by projecting a finger (not shown) through the opening 20 to support the fastener A and containers B therefrom.

The invention has been illustrated as a fastener A capable of removably holding four containers B in a grouped arrangement. It will be apparent, however, that the fastener A is not limited to use with four containers only, but that by varying the position of the slots J in the fastener, two or three containers could be carried equally well by use of such a modified fastener. Should it be desired to eliminate all lateral movement between the containers B when held together by the fastener A, a second faster A' of identically the same structure as fastener A can be affixed to the lower beads E', as shown in FIGURE 1. If a second fastener A' should be used on the bottom beads E', it is desirable that it be fabricated from a more resilient material than fastener A in order that fastener A' can be more easily removed from the containers. After removal of fastener A' from the containers, any one of the containers B can be easily separated from the fastener A by manipulating the selected container in the manner illustrated in FIGURE 10.

An alternate form of the invention is shown in FIGURE 11. The alternate form of the invention includes all of the elements in the preferred form thereof, but in which certain elements are modified as to configuration. In the drawings and description, like numerals are used in identifying the elements comprising the alternate form of the invention as employed with the preferred form, but with the numerals being distinguished therefrom by the addition of a prime (') thereto.

In FIGURE 11 it will be noted that a container B' is provided that comprises a cylindrical side wall C', a bead E', and an end piece D'. In the fabrication of end piece D' it is crimped to define a circumferentially extending groove 40 disposed adjacent the lower end of the inner surface 14' of the bead E'. The wall 28', as may be seen in FIGURE 11, has a downwardly and inwardly tapering surface 42 and an oppositely disposed curved surface 44 which are connected by a curved end surface 46 of such configuration that is snugly engages the surface portion of end piece D' defining the groove 40.

The inner portion F' of the alternate form of the invention includes a web 18', which in FIGURE 11 is exaggerated as to thickness. Web 18' is defined by an upper surface 48 and a lower surface 50, with the latter surface developing on its outer end into four upwardly and outwardly tapering arcuate surfaces 52. The upper ends of surfaces 52 develop into surfaces 54 that abut against the external surface of the cylindrical side wall C'. Each of the surfaces 54 is concave and is of the same radius of curvature as the exterior surface of the side wall C'.

The wall 28' and web 18' are separated by slots J'. The upper edge of each concave surface 54 develops into a downwardly and inwardly inclined annulus-shaped surface 56 that is disposed at an angle of less than 90° relative to the surface 54. Each surface 56, as shown in FIGURE 11, extends upwardly and outwardly under the bead E' to removably interlock therewith. The inner end of surface 56 develops into an upwardly and inwardly extending surface 58 that intersects the surface 48 and forms a circular junction line 60 therewith. Each surface 56 is sufficiently wide that the surface 58 is so spaced relative to the bead E' as to not exert pressure thereon, and prevent surface 54 from contacting the external surface of side wall C'.

The alternate form of the invention operates in precisely the same manner as the preferred form but grips the container C' more firmly due to the configuration of the groove 40 and the surface 56 which extend upwardly and outwardly to interlock with the lower end 12' of the bead E' with the surface 54 firmly abutting the exterior surface of container C'.

Although the present invention is fully capable of achieving the objects and providing the advantages hereinbefore mentioned, it is to be understood that it is merely illustrative of the presently preferred embodiments thereof and we do not mean to be limited to the details of construction herein shown and described, other than as defined in the appended claims.

We claim:

1. A package including a plurality of cans, a device removably holding the plurality of cans together in a predetermined relationship, which cans define a partially closed opening therebetween, with each of said cans including a side wall having a circumferentially extending bead on the upper end portion thereof, each of which beads is defined by first and second radially spaced, longitudinally extending cylindrical surfaces, with said first and second surfaces merging at their upper extremities into a first convex upper edge, and said second surface terminating on the lower end thereof in a second convex lower edge that is disposed outwardly from said side wall which device comprises:

(a) a resilient, substantially square polymerized resin body that includes a web having a plurality of reinforcing ribs projecting upwardly therefrom, at least a portion of which ribs are in circumferentially spaced relationship, extending outwardly from the central portion of said web, with said web having a plurality of circumferentially spaced, concave outer edges of substantially the same radius of curvature as said second cylindrical surface, said outer edges extending below said second convex lower edge in pressure contact with the outer surface of said side wall, and said second convex lower edge of the bead being disposed on the upper surface of said web, which web has a plurality of circumferentially spaced surfaces that extend downwardly and inwardly from said concave outer edges;

(b) a plurality of extensions in radial alignment with said circumferentially spaced ribs and disposed at the outer extremities thereof, which extensions are integrally formed with said ribs and web and extend in a plane above and parallel to said web; and (c) a plurality of outer portions disposed outwardly from said web, each of which outer portions lies in the same plane and connects two of said extensions, a convex wall depending downwardly from the inner edge of each of said outer portions and from said two extensions, the portion of said wall which depends from said extensions, which connect said outer portions, having an inner surface inwardly offset from the inner surface of the rest of said wall, the lowermost portion of the inner surface of said convex wall, which depends from said outer portion, and said offset inner surfaces contacting said first cylindrical surface of said bead, the radial distance between said offset inner surfaces and the concave outer edges of said web being less than the thickness of said bead, whereby when said body is moved downwardly relative to said plurality of cans said offset inner surfaces are in pressure contact with said first cylindrical surface of said bead and said concave outer edge is in initially pressure contact with said second cylindrical surface of said bead until said body is moved into carrying position.

2. A device as defined in claim 1 wherein said plurality of ribs includes a first circular rib that extends upwardly from substantially the center of said web and said circumferentially spaced ribs extending outwardly therefrom are integrally connected thereto.

3. A device as defined in claim 1 wherein an opening is formed in said web within the confines of said first circular rib, which opening is of sufficient cross section as to permit the finger of a user to be inserted therethrough to permit said package to be carried.

References Cited by the Examiner

UNITED STATES PATENTS

| | | | |
|---|---|---|---|
| 2,566,804 | 9/51 | LaFlamme et al. | |
| 2,680,040 | 6/54 | Gribskov et al. | 206—65 |
| 2,863,556 | 12/58 | Bedford | 24—81 X |
| 3,022,888 | 2/62 | Brunsing. | |
| 3,036,853 | 5/62 | Glazer | 294—87.2 |
| 3,143,210 | 8/64 | Heydon | 206—65 |

THERON E. CONDON, *Primary Examiner.*

M. HENSON WOOD, JR., *Examiner.*